(12) United States Patent
Ward et al.

(10) Patent No.: US 6,186,595 B1
(45) Date of Patent: *Feb. 13, 2001

(54) FOLDING SEAT HINGE

(75) Inventors: Richard W. Ward, West Chester;
Edward W. Hand, Cincinnati, both of OH (US)

(73) Assignee: W. K. Manufacturing Corporation, Arnold, MO (US)

(*) Notice: Under 35 U.S.C. 154(b), the term of this patent shall be extended for 0 days.

This patent is subject to a terminal disclaimer.

(21) Appl. No.: 09/431,854

(22) Filed: Nov. 2, 1999

Related U.S. Application Data

(63) Continuation of application No. 09/034,500, filed on Mar. 4, 1998, now Pat. No. 6,045,190, which is a continuation-in-part of application No. 08/707,235, filed on Sep. 3, 1996, now Pat. No. 5,725,279.

(51) Int. Cl.[7] ........................................................ B60N 2/02
(52) U.S. Cl. ........................................ 297/378.1; 297/376
(58) Field of Search ............................... 297/378.1, 376; 16/358, 359, 360, 374

(56) References Cited

U.S. PATENT DOCUMENTS

| | | |
|---|---|---|
| 1,703,969 | 3/1929 | Syvrud . |
| 3,001,225 | 9/1961 | Squire . |
| 3,328,077 | 6/1967 | Krasinski . |
| 3,359,028 | 12/1967 | Seckerson . |
| 3,740,791 | 6/1973 | Bulin . |
| 4,541,672 | 9/1985 | Fukuta et al. . |
| 4,775,187 | 10/1988 | Herr . |
| 4,846,526 | 7/1989 | Allen . |
| 4,997,223 | 3/1991 | Croft . |
| 5,015,026 | 5/1991 | Mouri . |
| 5,052,076 | 10/1991 | Spaeth . |
| 5,172,969 | 12/1992 | Reuter et al. . |

*Primary Examiner*—Laurie K. Cranmer
(74) *Attorney, Agent, or Firm*—Wood, Herron & Evans, L.L.P.

(57) ABSTRACT

A folding seat hinge (10) having a first hinge member (16) with an arcuate slot (46) radially displaced from the pivot axis (40) of the hinge. A second hinge member (12) is disposed with respect to one side (54) of the first member (16) to fully cover the slot (46) over the full range of pivoting motion of the hinge members (12, 16). A guide pin (58) is coupled to the second member (12), extends through the arcuate slot (46) in the first member (16) and functions to limit the pivoting motion between the hinge members. A cover plate (70) is disposed with respect to an opposite side (72) of the first hinge member (16) to fully cover the slot (46) over the full range of pivoting motion. A pivot pin (14) secures the hinge members (12, 16) and the cover plate (70) in an assembly and provides the axis of rotation (40) for the hinge members.

19 Claims, 3 Drawing Sheets

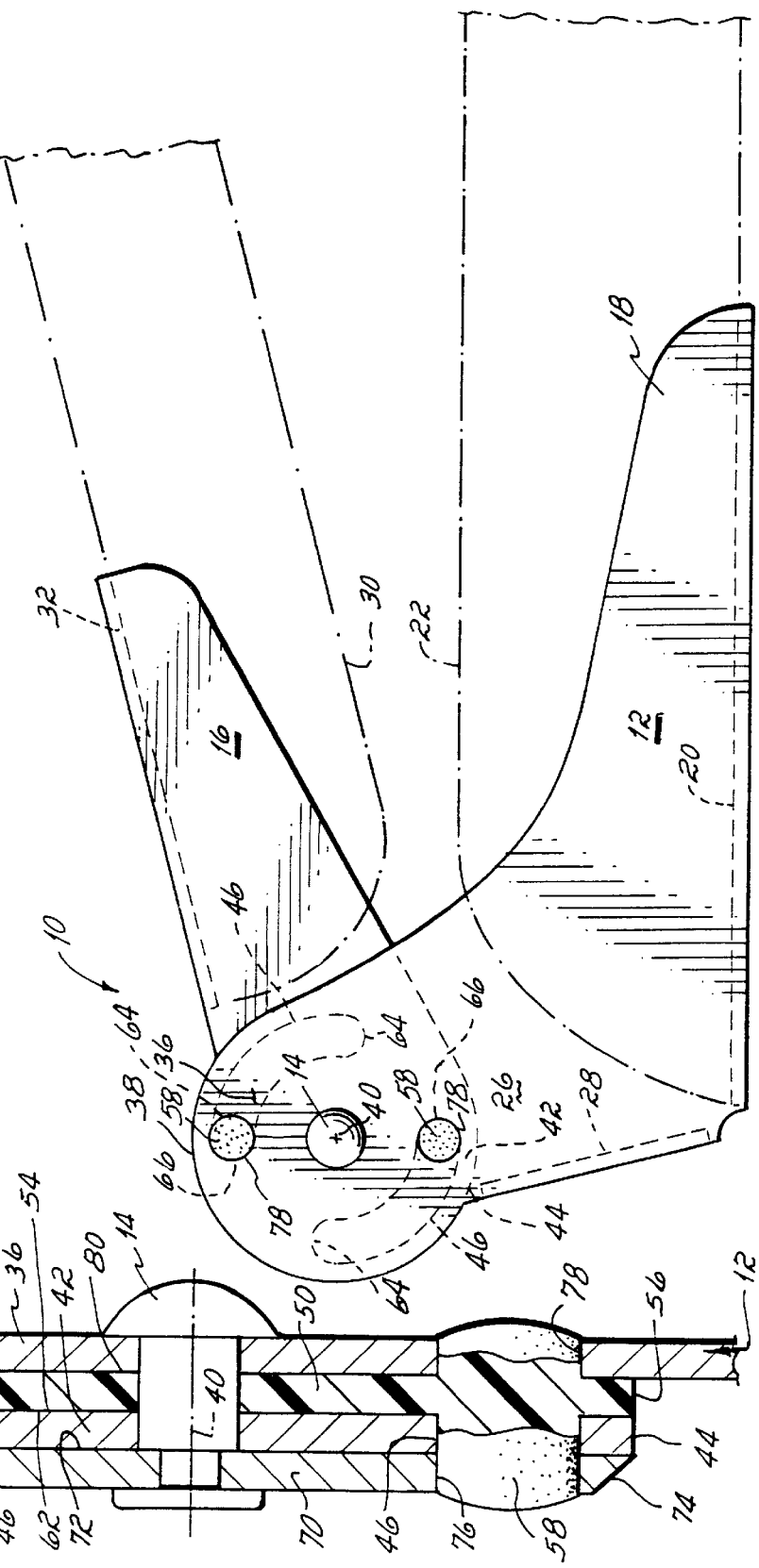

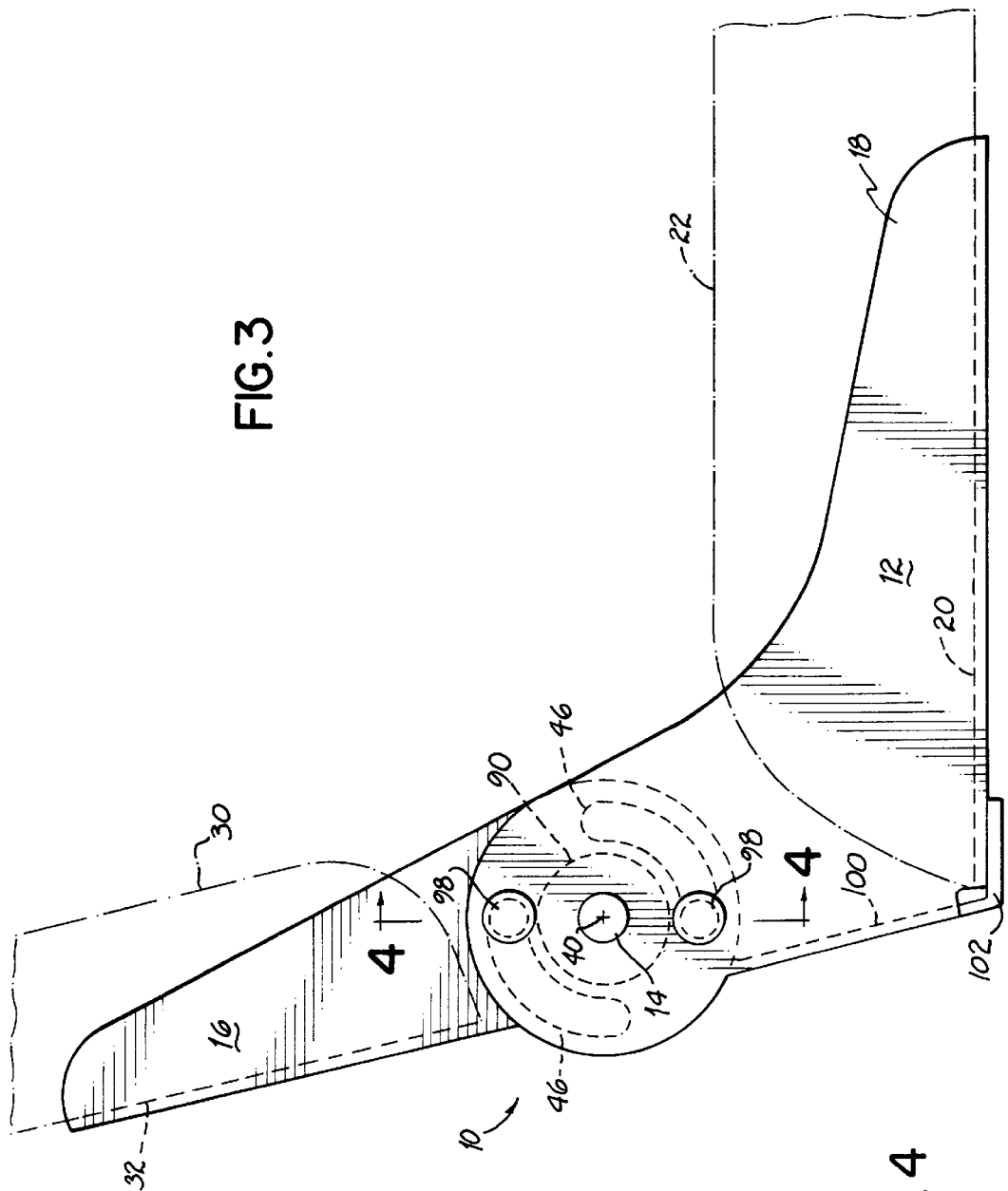

US 6,186,595 B1

FOLDING SEAT HINGE

This application is a continuation of U.S. patent application Ser. No. 09/034,500 filed Mar. 4, 1998 now U.S. Pat. No. 6,045,190 for FOLDING SEAT HINGE, which is a continuation-in-part of U.S. patent application Ser. No. 08/707,235 filed Sep. 3, 1996 for FOLDING SEAT HINGE, now U.S. Pat. No. 5,725,279.

FIELD OF THE INVENTION

This invention relates generally to folding chairs or seats and more particularly, to hinges for moving seat backs between a lower, folded position and a generally upright position for seating.

BACKGROUND OF THE INVENTION

Many boats have a folding chair or seat in which the seat back is movable between generally upright and folded positions with respect to a seat bottom. A pair of hinges are often used to connect the folding seat back to the seat bottom and are often located at and extend along the sides of the seat back and the seat bottom. Each hinge of the pair is either identical to or a mirror image of the other hinge. Each of the pair of hinges often includes first and second metal plates that are pivotally connected at their ends. The first metal plate is connected at one side of the seat back with a first end extending therefrom, and the second metal plate is connected to a common side of the seat bottom with a second end extending therefrom. The adjacent extending ends of the metal plates are held together with rivets or pins that provide an axis of rotation for the movable, first metal plate and the seat back with respect to the fixed, second metal plate and the seat bottom. Therefore, being interconnected by the pair of hinges laterally located with respect to the seat, the seat back can be easily moved between the upright and folded positions.

Preferably the hinge is designed such that throughout the extent of motion of the movable hinge member connected to the seat back, no openings are created between the relatively moving hinge members that could pinch the finger or hand of a user. While it is impossible to eliminate the relative motion between the hinge members, it is desirable that during their relative motion, there are no edges on one hinge member that sweep over surfaces of the other hinge member. Such a relative motion between an edge and a surface has the potential of creating a pinch point. Further, such relative motion normally results in the edge reaching a position where it bears against the other hinge member in a supporting relationship to first, control the extent of motion of the seat back with respect to the seat bottom and second, to provide a mechanical support for the seat back when the seat is generally upright and in use. Anytime an edge and a surface have relative motion, the potential for a pinch point exists. Further, if the edge contacts and bears against the other hinge member, a larger pinch point exists.

For purposes of our discussion, an edge of the movable hinge member may move over a surface of the fixed hinge member, or a surface of the movable hinge member may sweep under an edge of the fixed hinge member. Often, such edges are generally parallel to the axis of rotation of the hinge. In addition, other edges which may result in pinching are those that move over a hinge member surface that extends laterally with respect to the seat and perpendicular to the axis of rotation.

Therefore, there is a need for a folding seat hinge, the construction of which does not contain exposed edges on one member that move with respect to a surface of the other member during the hinge motion. Such a hinge construction should also provide a mechanism for limiting the motion of one hinge member with respect to the other hinge member, but without creating pinch points.

SUMMARY OF THE INVENTION

The present invention provides a folding seat hinge that has a symmetrical, sturdy and pleasing appearance, is lightweight and eliminates potential pinch points between the moving hinge member and the fixed hinge member. The hinge of the present invention further limits the relative motion between the hinge members and is particularly suitable for use with folding seats on boats.

According to the principles of the present invention, and in accordance with the described embodiments, the folding seat hinge has pivotally interconnected first and second hinge members that are connected between a seat back and a seat bottom. The first hinge member has an arcuate slot radially displaced from the pivot axis of the hinge members. The second member is disposed with respect to one side of the first member to fully cover the slot over the full range of pivoting motion of the hinge members. A cover plate is disposed with respect to an opposite side of the first hinge member, and the cover plate is sized so as to fully cover the slot over the full range of pivoting motion of the hinge members. A guide pin coupled to the second member, extends through the arcuate slot in the first member and functions to limit the pivoting motion between the hinge members. A pivot pin secures the hinge members and the cover plate in an assembly and provides the axis of rotation for the hinge members. The above construction provides a mechanism for limiting hinge motion that is completely contained within the hinge, and therefore, has the advantage of having no pinch points.

BRIEF DESCRIPTION OF THE DRAWINGS

FIG. 1A is a side elevation view of the folding seat hinge of FIG. 1 illustrated in the folded position.

FIG. 2 is a cross section view taken along the line 2—2 in FIG. 1.

FIG. 3 is a side elevation view of an alternative embodiment of the folding seat hinge in accordance with the principles of the present invention.

FIG. 4 is a cross section view taken along the line 4—4 in FIG. 3.

DETAILED DESCRIPTION OF THE INVENTION

Figure 1:
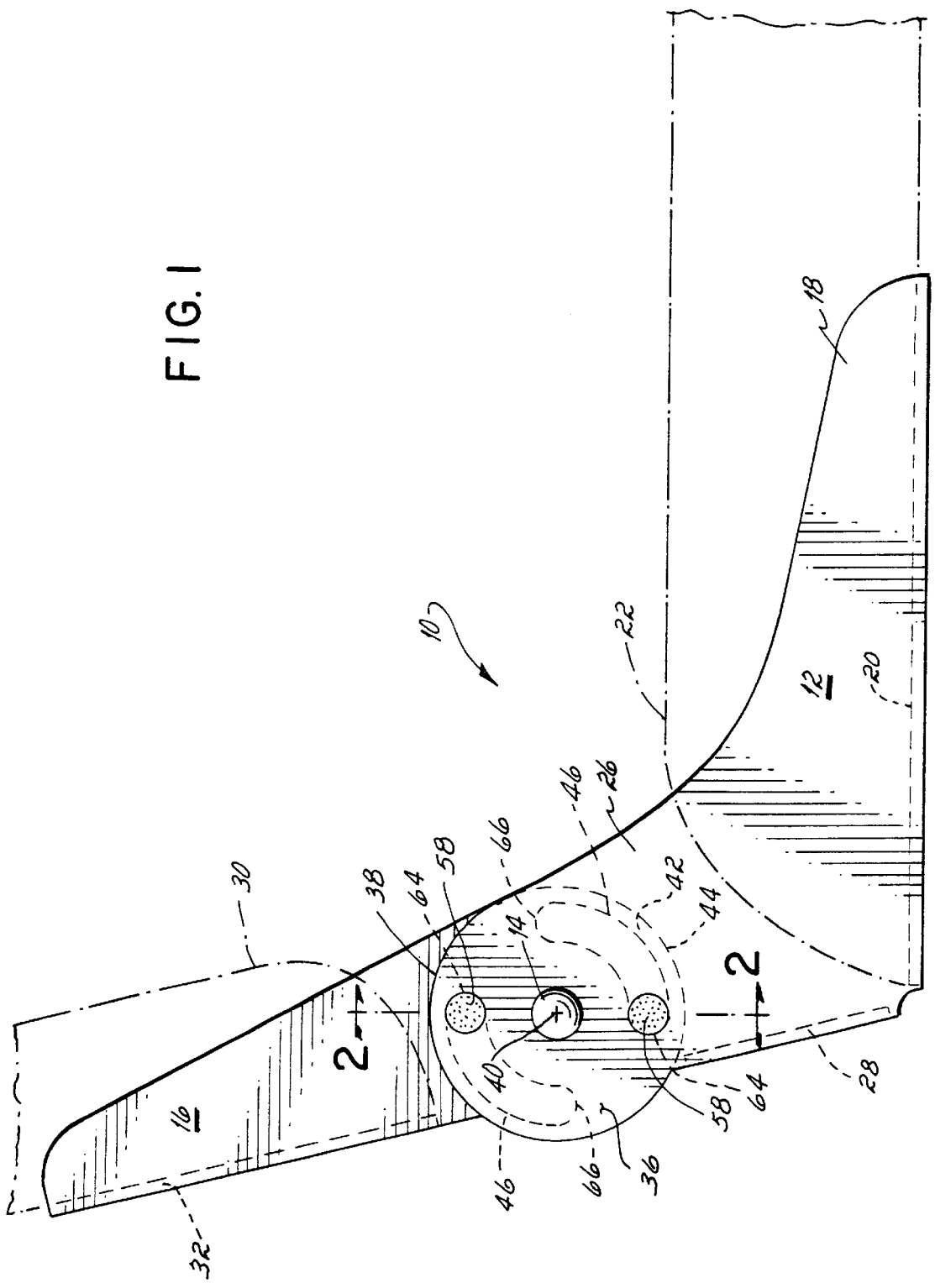
FIG. 1 is a side elevation view of the folding seat hinge in accordance with the principles of the present invention illustrated in the open, generally upright position.

Referring to FIG. 1, the folding seat hinge 10 has a first or lower member 12 that is pivotally connected by the pivot pin 14 with a second or upper hinge member 16. The first member 12 includes a generally horizontal lower section 18 that includes a right angle mounting flange 20. The mounting flange 20 is adapted to be connected to the underside of a seat bottom or cushion 22 using screws, bolts, rivets, other fasteners or an adhesive. The seat bottom 22 is mounted in known ways to a structure. For example, on a boat, the seat bottom 22 is often mounted to a centrally located column or pedestal that extends between the underside of the seat bottom 22 and the deck (not shown) of the boat. Further, the pedestal supporting the seat bottom 22 often provides a pivoting or swiveling of the seat 10. The lower section 18 of first hinge member 12 extends from the underside of the seat cushion 22 upward and along a side of the seat cushion 22.

The first hinge member 12 further has an upper or second section 26 that angles upwardly from and along the side of the seat bottom 22. The upper section 26 also has a right angle flange 28 extending inward toward the mid-section of the seat 10 and provides strength and rigidity to the lower hinge member 12. The upper hinge member 16 extends generally along a side of the folding seat back 30 and includes a right angle mounting flange 32 that is attached to a rear side of the seat back 30 by bolts, screws, other fasteners or an adhesive. As will be appreciated, a mirror image of the hinge 10 is mounted on opposite sides of the seat bottom 22 and the seat back 30. Therefore, the hinges 10 permit the seat back 30 to be moved between generally upright and folded positions with respect to the seat bottom 22.

The folding seat hinge is shown in more detail with reference to FIGS. 1 and 2. The upper section 26 of the lower hinge member 12 has a connective end 36 with a generally circular arc forming its perimeter 38. The circular arc is located a fixed radius from the centerline of the pivot pin 14 which is colinear with the axis of rotation 40. The upper hinge member 16 has a connective end 42 that also has a generally circular arc forming its perimeter 44 and located a fixed radius from the axis of rotation 40. Preferably, the radii of the perimeters 38 and 44 are equal. The connective end 42 of the second hinge member 16 contains a pair of arcuate slots 46. The slots 46 have opposing sides with a generally circular shape located a second constant radius from the axis of rotation 40. Preferably the centerlines of the slots 46 are located approximately at the midpoint of the radius of the perimeter 44. The connective end 36 of the first hinge member 12 has an inner directed surface 52 disposed adjacent an inner directed side 54 of the connective end 42 of the second hinge member 16. Further, since the radii of the perimeters 38, 44 are substantially equal, the connective end 36 covers the entire area of the slots 46 over the full range of motion between the hinge members 12, 14.

The hinge 10 includes an intermediate plate 50 mounted between the inner directed surfaces 52 and 54 of the respective connective ends 36, 42 of the first and second hinge members 12, 16, respectively. The intermediate plate 50 further preferably has a circular perimeter 56 with a center line coincident with the axis of rotation 40 and a radius substantially equal to the radii of the perimeters 38, 44 of the respective connective ends 36, 42. Therefore, the intermediate plate 50 covers the entire area of the slots 46 over the full range of motion between the hinge members 12, 14.

The intermediate plate 50 has a pair of pins 58 extending from an inner side 62 of the plate 50 and through the slots 46 in connective end 42 of the upper hinge member 16. The slots 46 have a length such that first ends or stop surfaces 64 contact pins 58 to limit motion of the upper hinge member 16 in moving the seat back 30 to a generally upright, unfolded, open position. The slots 46 have second ends or stop surfaces 66 that bear against the pins 58 to limit motion of the upper hinge member 16 when the seat back 30 is moved to a lower, folded position shown in FIG. 1A.

The folding seat hinge 10 further includes a cover plate 70 that is located over an outer surface 72 of the connective end 42 of the upper hinge member 16. The cover plate preferably has a circular perimeter 74 with a center line coincident with the axis of rotation 40. The circular perimeter 74 further preferably has a radius substantially equal to the radii of the intermediate plate 50 and the perimeters 38, 44 of the respective connective ends 36, 42 of the first and second hinge members 12, 16, respectively. Therefore, the cover plate 70 has an area that is effective to cover the full areas of the slots 46 throughout the full range of relative motion of the hinge members 12, 16.

The pivot pin 14 is preferably a nut and bolt, a rivet or other fastener that extends through the first and second hinge members 12,16, the intermediate plate 50, and the cover plate 70 to secure those hinge elements into a hinge assembly. In the preferred embodiment, the cover plate 70 includes holes 76 through which the pins 58 extend. In addition, the connective end 36 of the upper section 26 of the first hinge member 12 has holes 78, and the pins 58 extend from an outer surface 80 through the holes 78 in the connective end 36 of the first hinge member 12. As will be appreciated, the detailed construction of the hinge 10 described above applies to the mirror image hinge attached to the opposite side of the seat bottom 22 and the seat back 30.

In use, when the seat back 30 is moved to the generally upright, open position illustrated in FIG. 1, the pins 58 contact and are supported by the ends 64 of the slots 46. With the motion of the seat back 30 so limited, a person sitting in the seat 10 and leaning back against the seat back 30 is adequately supported by the hinge 10. The user may at any time choose to move the seat back 30 to the lower, folded position shown in FIG. 1A. In that motion, the user pivots the seat back 30, and the attached upper hinge members 16 in a clockwise direction as illustrated in FIG. 1 to move the seat to the lower or folded position as shown in FIG. 1A. In that process, as the upper hinge member 16 is rotated, its connective end 44 and the slots 46 are similarly rotated with respect to the axis of rotation 40. That rotation continues until the ends or stop surfaces 66 of the slots 46 contact the guide pins 58, thereby limiting the pivoting motion of the seat back 30.

During the motion of the seat back 30 and upper hinge member 16 with respect to the seat bottom 18 and lower hinge member 12, the lower hinge member 12, the intermediate plate 50, the guide pins 58, the cover plate 70, and preferably, the pivot pin 14 remain stationary, and the upper hinge section 16 moves relative to those stationary elements. The upper hinge member 16 moves relative to the circular perimeters 56, 74 of the intermediate plate 50 and cover plate 70, respectively. Since the relative motion between the upper hinge member 16 and the perimeters 38, 74 is defined along a continuous circular path, and the perimeters 38, 74 do not move across a surface of the upper hinge section 16, it is almost impossible for that relative circular motion to create a pinch point. Since the cover plate 70 covers the slots 46 in their entirety over the full range of motion of the upper hinge member 16, a second advantage is that there are no pinch points exposed to the user by the motion of the slots 46 with respect to the pins 58. Further, the connective ends 38, 42 of the respective first and second hinge members 12, 16, the intermediate plate 50, and the cover plate 70 have substantially identical radii. Therefore, advantageously the relative motion of the perimeter 44 of the second hinge member 16, with respect to the perimeters 56, 74 of the respective intermediate plate 50 and cover plate 70 cannot, as a practical matter, create a pinching relationship with the stationary adjacent perimeters 56, 74.

Preferably, the hinge members 12, 16 are made of aluminum, and the cover plate 70 and the intermediate plate 50 and guide pins 58 are made from a "NYLON" material. The intermediate plate 50 has a thickness approximately equal to the thickness of the hinge members 12, 16 and is effective to strengthen the hinge assembly and stabilize the relative motion between the hinge members 12, 16. The pins 58, connected to the intermediate plate 50, extend through holes 76, 78 of the cover plate 70 and connective end 36 of the first hinge member 12 so that preferably, all of those elements remain stationary and mechanically coupled with the first hinge member 12 during the relative motion of the second hinge member 16.

Extending the pins 58 through the cover plate 70 provides another advantageous feature. If the pins were covered by the cover plate 70, and one of the pins would fracture and separate from the intermediate plate 50, that fractured pin would have no load-carrying capability and would offer no support for the seat back 30 when in the upright position. Therefore, the entire load of a person seated in the seat 10 would undesirably, be carried by only one of the pins 58. Since the pins 58 extend through the holes 76 in the cover plate 70, if one of the pins 58 fractures and separates from the intermediate plate 50, it will drop out from its respective hole 76, thereby providing a visual indication that the pin and the hinge is broken.

FIGS. 3 and 4 illustrate an alternative embodiment of the hinge in which the intermediate plate 50 of FIG. 2 and its protruding pins 58 are not used. Instead, a first plate or washer 90 is mounted between the opposed surfaces 52 and 54 of the respective connective ends 36, 42 of the first and second hinge members 12, 16, respectively. A second plate or washer 92 is mounted between the surface 94 of connective end 42 of the second hinge member 16 and an opposed surface 96 of the cover plate 70. The disks 90, 92 are normally circular with center holes 93, 95, respectively, sized to receive the pivot pin 14. The plates 90, 92 normally have a radius less than the radial location of the slots 46, that is, the plates 90, 92 extend up to but do not overlap the slots 46. Fasteners 98 extend through the holes 78 of the connective end 36 of the first hinge member 12, through the slots 46 of the connective end 42 of the second hinge 16 and through the holes 76 of the cover plate 70. The fasteners 98 are normally stainless steel rivets but may also be screws, bolts or other appropriate fasteners.

The hinge in the embodiment of FIGS. 3 and 4 operates identically as previously described with respect to the embodiment of FIGS. 1 and 2. The plates 90, 92 perform several functions. First, they function to maintain a first separation between the connective ends 36, 42 and a second separation between the connective end 42 and the cover plate 70. Those parts are normally made of aluminum which is a softer metal. Aluminum parts rubbing against each other have a tendency to pick up and wear more quickly. By maintaining the aluminum components separated in a non-contacting relationship, the hinge operates more reliably over a longer period of time. The plates 90, 92 also function as clutch plates, that is, they provide limited frictional forces between the moving upper hinge member 16 and the plates 90, 92. Thus, the seat back 30 does not move too freely and tends to stay in intermediate positions between the unfolded and folded positions. Finally, the plates 90, 92 function as wear components and are designed to provide a higher wear than the aluminum components. To provide the above functions, the plates 90, 92 are normally made from a graphite impregnated nylon or a mylar and have a thickness of approximately 0.015 inches.

The lower hinge member 12 of FIG. 3 has a further difference from that illustrated in FIG. 1. The flange 28 of FIG. 1 is shown as a flange 100 in FIG. 3 and includes a portion 102 extending over the mounting flange 20. The flange portion 102 is secured to the mounting flange 20 by rivets (not shown) or the mounting fasteners (not shown) that mount the hinge member 12 to the seat 22.

While the present invention has been illustrated by the description of the preferred embodiment, and while the preferred embodiment has been described in considerable detail, it is not the intention to restrict or in any way limit the scope of the appended claims to such detail. Additional advantages and modifications will readily appear to those who are skilled in the art. For example, the pins 58 could be rigidly connected to the connective end 36 of the first hinge member 12 and extend through the intermediate plate 50 and into the slots 46. In that embodiment, the intermediate plate 50 could be made substantially thinner than the thickness of the hinge members 12, 16, or in an alternative embodiment, not used in the hinge assembly.

In addition, the length of the pins 58 could be shortened such that they extend only through the slots 46 and not into the holes 76 of a cover plate 70. In that embodiment, the cover plate 70 can be a solid member without the holes 76. Even though with that embodiment, the cover plate may experience some motion as the upper hinge member 16 is moved with respect to the lower hinge member 12, that motion will not create a pinch point. In a further alternative, the pins 58 may be connected or made integral with the cover plate 70. Preferably, the portions of the pins 58 extending from both sides of the intermediate plate 50 are substantially colinear. Alternatively, the pins extending from one side of the intermediate plate 50 may have a different location with respect to the pins extending from the opposite side of the intermediate plate 50. Further, the pins 58 extending from the opposite sides of the intermediate plate 50 may have different diameters.

Further, in the preferred embodiment the slots 46 and mating pins 58 are symmetrically located in the connective end 42, that is, they are generally opposite each other. In other embodiments, the slots may be relocated. They both may be shifted in a circumferential direction with respect to each other; or they both may be shifted radially with respect to the axis of rotation. Therefore, the slots may be located at the same or different radii and in any circumferential position with respect to each other. In fact, the slots may be moved to be located at different radii but at the same circumferential location, that is, parallel to each other.

In a further alternative, the radius of the perimeter 44 at the connective end 42 may be slightly less than the radius of the adjacent perimeters 56, 74, thereby further minimizing the exposure to the user of the circular motion of the perimeter 44. As will be appreciated, the position of the first hinge member 12 and the second hinge member 16 may be reversed within the hinge assembly so that the slots 46 are in the first hinge member 12 located between the intermediate plate 50 and the cover plate 70.

The invention, therefore, in its broadest aspects is not limited to the specific details shown and described. Consequently, departures may be made from the details described herein without departing from the spirit and scope of the claims which follow.

What is claimed is:

1. A hinge for connecting a folding seat back to a seat bottom, the folding seat back being movable between generally upright and folded positions with respect to the seat bottom, the hinge comprising:

a first member having a mounting surface adapted to be connected to one of the seat back and the seat bottom, the first member having opposed stop surfaces;

a second member having a mounting surface adapted to be connected to the other of the seat back and the seat bottom and being disposed adjacent one side of the first member such that over a full range of relative motion between the first and second members, the second member fully covers an area between the opposed stop surfaces on the one side of the first member;

a cover plate disposed adjacent an opposite side of the first member, the cover plate being sized to fully cover the area between the opposed stop surfaces on the outer side of the first member over the full range of relative motion between the first and second members;

a guide pin carried by the second member and extending between the opposed stop surfaces in the first member, the stop surfaces of first member stopping relative motion between the guide pin and the first member to define limits of the full range of relative pivoting motion between the first and second members; and a pivot pin providing relative pivoting motion between the first and second members and securing the first and second members and the cover plate in a hinge assembly that, over the full range of motion, does not have pinch points.

2. A hinge for connecting a folding seat back to a seat bottom, the folding seat back being movable between generally upright and folded positions with respect to the seat bottom, the hinge comprising:

a first member adapted to be connected to one of the seat back and the seat bottom, the first member having a first hole and two opposed stop surfaces;

a second member having a first hole and a second hole and adapted to be connected to the other of the seat back and the seat bottom, the second member being disposed adjacent one side of the first member such that over a full range of relative motion between the first and second members, the second member fully covering an area between the opposed stop surfaces on the one side of the first member;

a cover plate having a first hole and a second hole and being disposed adjacent an opposite side of the first member, the cover plate being sized to fully cover the area between the stop surfaces on the opposite side of the first member over the full range of relative motion between the first and second members;

a first fastener extending through the second hole in the second member, between the stop surfaces in the first member and through the second hole in the cover plate, the opposed stop surfaces in the first member stopping relative motion between the first fastener and the first member to define limits of the full range of relative motion between the first and second members; and a second fastener extending through the first holes in the first and second members and the cover plate and providing a pivot for relative motion of the first member with respect to the second member and the cover plate, the second fastener securing the first and second members and the cover plate in hinge assembly that, over the full range of motion, does not have pinch points.

3. A hinge for connecting a folding seat back to a seat bottom, the folding seat back being movable between generally upright and folded positions with respect to the seat bottom, the hinge comprising:

a first member having a first end adapted to be connected to one of the seat back and the seat bottom, the first member having a second end terminating in a generally circular arc having a first radius, the second end of the first member having two opposed stop surfaces;

a second member disposed adjacent one side of the first member, the second member having a first end adapted to be connected to the other of the seat back and the seat bottom, the second member having a second end terminating in a generally circular arc having the first radius;

a cover plate disposed adjacent an opposite side of the first member, the cover plate having a generally circular shape determined by the first radius;

a stop carried by the second member and extending between the opposed stop surfaces of the first member to define limits of relative pivoting motion between the first and second members; and a pivot pin securing the first and second members and the cover plate in an assembly such that the circular arcs of the first and second members and the cover plate are coextensive, the pivot pin, the first and second members and the cover plate forming a hinge assembly that over the full range of motion, does not have pinch points.

4. A hinge for connecting a folding seat back to a seat bottom, the folding seat back being movable between generally upright and folded positions with respect to the seat bottom, the hinge comprising:

a first member having a first end adapted to be connected to one of the seat back and the seat bottom, the first member having a second end terminating in a generally circular arc having a first radius, the second end of the first member having two opposed stop surfaces;

a second member disposed adjacent one side of the first member, the second member having a first end adapted to be connected to the other of the seat back and the seat bottom, the second member having a second end terminating in a generally circular arc having the first radius;

a cover plate disposed adjacent an opposite side of the first member, the cover plate having a generally circular shape determined by the first radius;

a first fastener extending through the second member, between the opposed stop surfaces of the first member and through the cover plate, the opposed stop surfaces stopping relative motion between the first fastener and the first member to define limits of relative pivoting motion between the first and second members; and a second fastener securing the first and second members and the cover plate in an assembly such that the circular arcs of the first and second members and the cover plate are coextensive, the first and second fasteners, the first and second members and the cover plate forming a hinge assembly that over the full range of motion, does not have pinch points.

5. A seat hinge for connecting a folding seat back to a seat bottom comprising:

a first hinge member having at least two spaced apart stop surfaces;

a second hinge member being disposed on one side of the first hinge member and having a motion limiting projection extending between the spaced apart stop surfaces, the second hinge member covering any space between the opposed stop surfaces on the one side of the first hinge member over a full range of relative motion between the first and second hinge members;

a cover disposed adjacent an opposite side of the first hinge member, the cover covering the space between the opposed stop surfaces on the opposite side of the first hinge member over the full range of relative motion between the first and second hinge members; and means connecting the first and second hinge members and the cover together and providing relative pivoting motion between the first and second hinge members, the stop surfaces of first hinge member stopping relative motion between the projection and the first hinge member to define limits of the full range of relative pivoting motion between the first and second hinge members.

6. A seat hinge for pivotally attaching a seat back to a seat bottom comprising:

a first member having spaced apart stops;

a second member being disposed on one side of the first member and conveying a motion limiting projection extending between the spaced apart stops and defining therewith a limited pivotal range of motion between the first and second members, the second member covering any space between the opposed stops on the one side of the first member over a full range of motion between the first and second members;

means connecting the first and second members together and providing relative pivoting motion between the first and second members; and a cover disposed adjacent an opposite side of the first member, the cover covering the space between the opposed stop surfaces on the opposite side of the first member over the full range of relative motion between the first and second members, so that over a full range of motion between the first and second members the seat hinge does not have pinch points.

7. A seat hinge for pivotally attaching a seat back to a seat bottom comprising:

a first member having an inside surface including a projection receiving pathway with at least one stop surface;

a cover disposed adjacent an outside surface of the first member and fully covering the pathway: and a second member being disposed adjacent the inside surface of the first member and pivotally connected to the first member, the second member having a stop member projecting therefrom and into the pathway of the first member, the stop member and the at least one stop surface defining a limited pivotal range of motion between the first and second members, the second member covering the pathway on the inside surface of the first member so that over a full range of motion between the first and second members the seat hinge does not have pinch points.

8. A hinge for connecting a folding seat back to a seat bottom, the folding seat back being movable between generally upright and folded positions with respect to the seat bottom, the hinge comprising:

a first member adapted to be connected to one of the seat back and the seat bottom, the first member having an arcuate slot;

a second member adapted to be connected to the other of the seat back and the seat bottom and being disposed with respect to the first member such that over a full range of relative motion between the first and second members, the second member fully covers an area of the slot on an inner side of the first member;

a cover plate disposed adjacent an outer side of the first member, the cover plate being sized to fully cover the area of the slot on the outer side of the first member over the full range of relative motion between the first and second members;

a first fastener extending through the second member, through the slot in the first member and the cover plate, the slot in the first member having ends for stopping relative motion between the first fastener and the slot to define limits of relative pivoting motion between the first and second members; and a second fastener securing the first and second members and the cover plate in an assembly providing relative pivoting motion between the first and second members with respect to the second fastener over the full range of relative motion that does not have pinch points.

9. The hinge of claim 8 wherein the cover plate and second member have first holes adjacent the first slot and the first fastener extends through respective first holes in the cover plate and the second member and the first slot of the first member.

10. The hinge of claim 9 wherein the first and second members and the cover plate have second holes and the second fastener extends through respective second holes in the first and second members and the cover plate.

11. The hinge of claim 10 wherein the first member has a second slot.

12. The hinge of claim 11 wherein the cover plate and second member have third holes adjacent the second slot and a third fastener extends through respective third holes in the second member and the cover plate and the second slot of the first member.

13. The hinge of claim 12 wherein the second slot in the first member is an arcuate slot.

14. The hinge of claim 12 wherein the first, second and third fasteners are rivets.

15. The hinge of claim 8 further comprising a first spacer located between the first and second members.

16. The hinge of claim 15 further comprising a second spacer located between the first member and the cover plate.

17. The hinge of claim 16 wherein the first and second spacers are made from a mylar material.

18. The hinge of claim 17 wherein the first and second spacers are made from a graphite impregnated nylon material.

19. A hinge for connecting a folding seat back to a seat bottom, the folding seat back being movable between generally upright and folded positions with respect to the seat bottom, the hinge comprising:

a first member adapted to be connected to one of the seat back and the seat bottom, the first member having an arcuate slot;

a second member adapted to be connected to the other of the seat back and the seat bottom and being disposed with respect to the first member such that over a full range of relative motion between the first and second members, the second member fully covers an area of the slot on an inner side of the first member;

a cover plate disposed adjacent an outer side of the first member, the cover plate being sized to fully cover the area of the slot on the outer side of the first member over the full range of relative motion between the first and second members;

a first fastener extending through the second member, through the slot in the first member and the cover plate, the slot in the first member having ends for stopping relative motion between the first fastener and the slot to define limits of relative pivoting motion between the first and second members; and a second fastener extending through the second member, through the first member and the cover plate for securing the first and second members and the cover plate in an assembly providing relative pivoting motion between the first and second members with respect to the second fastener over a full range of motion that does not have pinch points.

* * * * *